United States Patent
Sykes

[11] Patent Number: 5,976,655
[45] Date of Patent: Nov. 2, 1999

[54] RIBBONS OF DUAL LIDS

[75] Inventor: Joseph A. Sykes, Grayslake, Ill.

[73] Assignee: Label Makers, Inc., Pleasant Prairie, Wis.

[21] Appl. No.: 09/108,954

[22] Filed: Jun. 30, 1998

Related U.S. Application Data

[62] Division of application No. 08/727,023, Oct. 8, 1996, Pat. No. 5,776,284.

[51] Int. Cl.$^6$ ........................................................ B32B 3/02
[52] U.S. Cl. .................... 428/40.1; 215/349; 220/359.1; 220/359.2; 220/359.3; 220/360; 222/544; 222/545; 222/546; 428/41.3; 428/42.3; 428/138; 428/194; 428/202; 428/906
[58] Field of Search ................................. 428/40.1, 131, 428/138, 172, 36.92, 906, 41.3, 194, 42.3, 202; 222/544, 545, 546; 215/349; 220/359.1, 359.2, 359.3, 360

[56] References Cited

U.S. PATENT DOCUMENTS

| | | | |
|---|---|---|---|
| 1,087,469 | 2/1914 | Stern | 229/122.32 |
| 2,776,787 | 1/1957 | Nicol | 222/544 |
| 2,886,220 | 5/1959 | Mangravite | 222/545 |
| 4,034,570 | 7/1977 | Bamberger et al. | 222/386 |
| 4,300,969 | 11/1981 | Frydendal . | |
| 4,530,230 | 7/1985 | Monks . | |
| 4,549,917 | 10/1985 | Jensen, Jr. . | |
| 4,550,842 | 11/1985 | Cummings | 220/359.3 |
| 4,657,614 | 4/1987 | Andersson . | |
| 5,125,529 | 6/1992 | Torterotot | 220/270 |
| 5,132,151 | 7/1992 | Graney | 428/41.3 |
| 5,300,344 | 4/1994 | Niedecker | 428/41.3 |
| 5,513,781 | 5/1996 | Ullrich et al. | 222/565 |
| 5,676,787 | 10/1997 | Rusincovitch et al. . | |

FOREIGN PATENT DOCUMENTS

| | | | |
|---|---|---|---|
| 642366 | of 1964 | Belgium | 222/565 |

*Primary Examiner*—Nasser Ahmad
*Attorney, Agent, or Firm*—Reising, Ethington, Barnes, Kisselle, Learman & McCulloch, P.C.

[57] ABSTRACT

A method of converting on a single line printing press, two webs of material into individual rolls of ribbons of dual-layered, peelably-bonded-together lids. One layer of each lid has dispensing holes formed therein, or otherwise is cut through to form plugs, and the other layer of each label is printed with selected indicia and/or logos. The resultant product is wound in multiple layers of ribbons, or so-called, "daisy chains" of dual-layered lids around cardboard cores ready for shipment to processors of food particles, such as salt or cheese, to be secured as individual covers on cup-like containers.

4 Claims, 3 Drawing Sheets

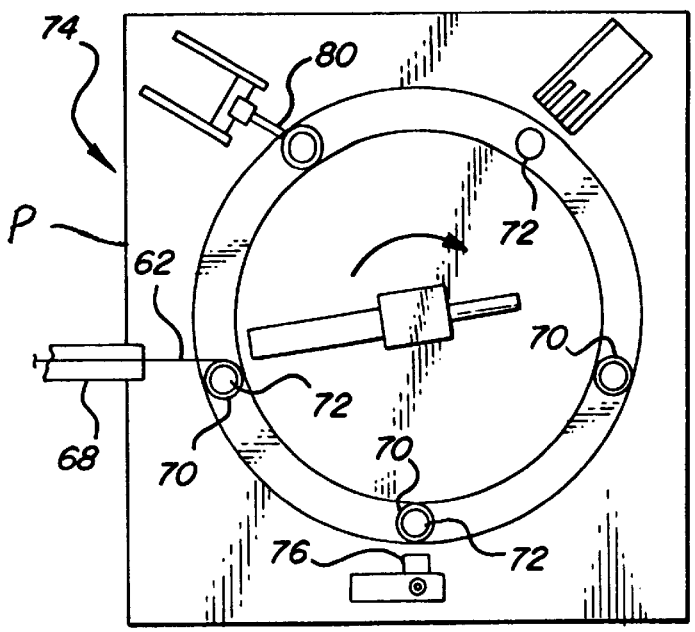
FIG-4
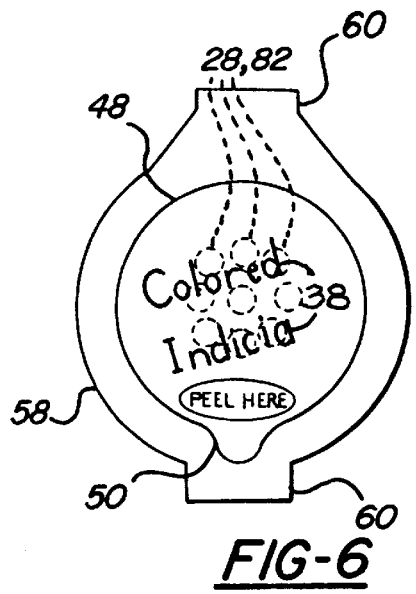
FIG-6
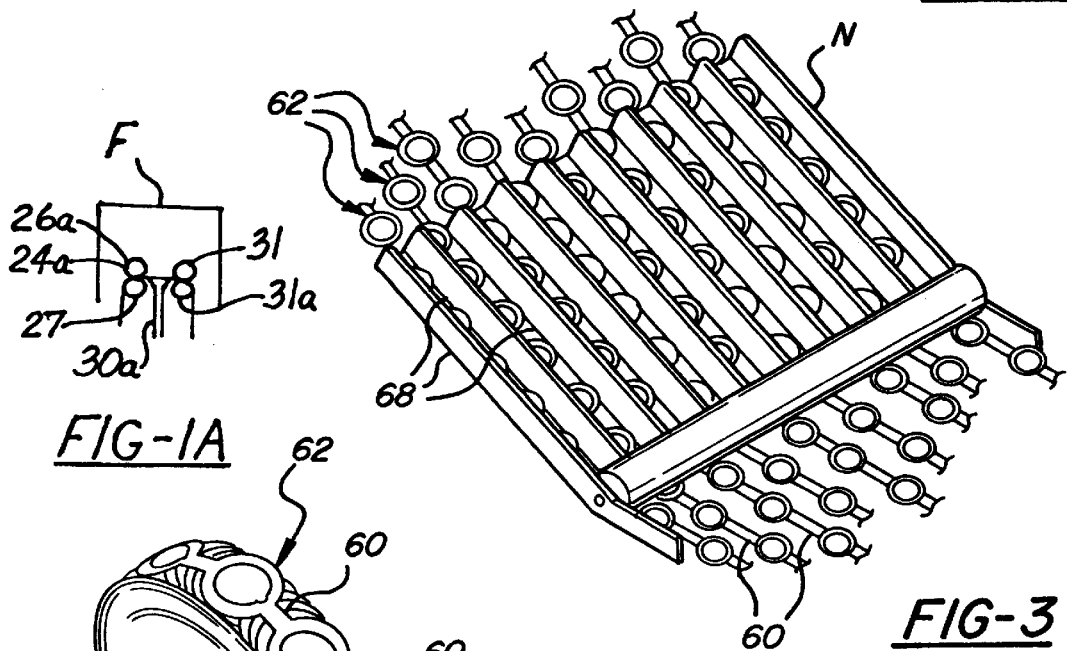
FIG-3
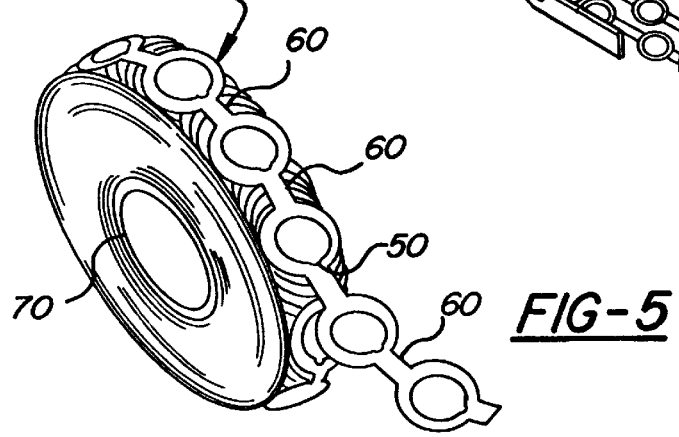
FIG-1A
FIG-5

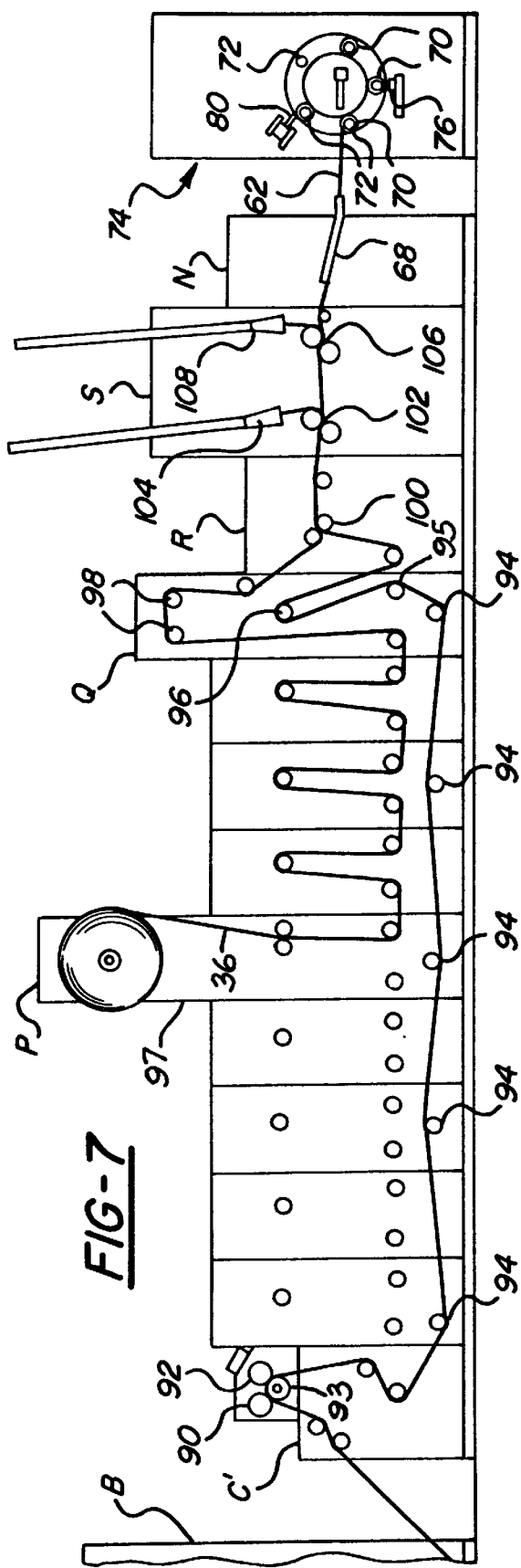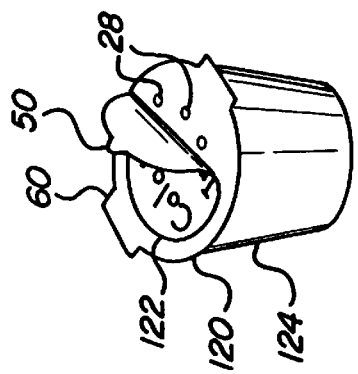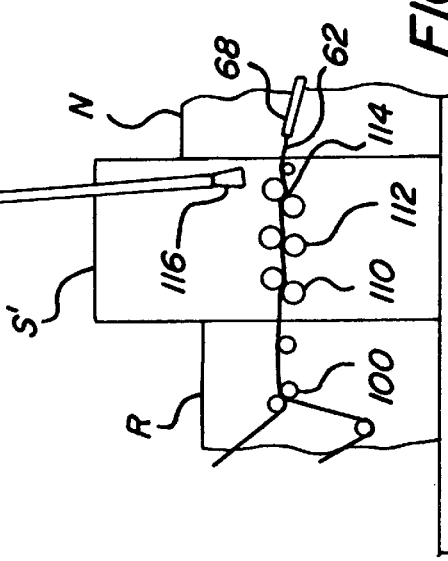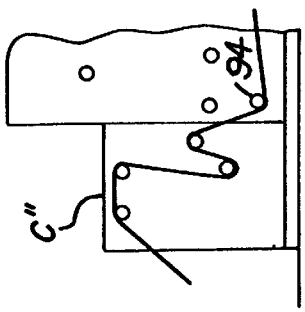

RIBBONS OF DUAL LIDS

This is a Divisional application of Ser. No. 08/727,023, filed Oct. 8, 1996, now U.S. Pat. No. 5,776,284.

FIELD OF THE INVENTION

This invention relates generally to printing presses and, more particularly, to in-line presses which are adapted to process dual-layered lids, wherein the inner layer is formed to include dispensing holes or removable plugs, and the outer layer is printed with selected indicia and peelably attached to the inner layer.

Background Art

Ullrich et al U.S. Pat. No. 5,513,781 discloses a container closure assembly including a sifter, a peel-away liner, and a screw-on or snap-on closure cap. The method taught by Ullrich et al includes forming individual sifters and applying adhesive thereto, forming individual liners and applying adhesive thereto, combining the two elements, and then applying the closure cap for transfer to a bottling site.

Torterotot U.S. Pat. No. 5,125,529 discloses a three-layer top for a thermoplastic container, including an internal polyethylene sheet, an intermediate polyester sheet, and an outer PVC-coated aluminum film sheet. In one embodiment, the intermediate sheet includes curved notches, such that the internal sheet breaks away upon the lifting of the outer sheet, exposing access openings from the container by removing along with the outer sheet the portions of the intermediate sheet defined by the notches. In another embodiment, recesses are formed in the intermediate sheet, into which the internal sheet is mounted to abut against the PVC-coated outer sheet. Upon lifting the latter, the internal sheet breaks to expose access openings.

Bamberger et al U.S. Pat. No. 4,934,570 discloses an end closure for a dispensing container, which includes a dispensing disk having a plurality of normally closed petals formed therein which are urged into an open, dispensing mode upon the contents being pushed through the petals by a slidably mounted plunger disk having a shaft operatively connected thereto.

Mangravite U.S. Pat. No. 2,886,220 discloses a sifter closure including a flexible adhesive covered, centrally perforated disk which is pushed by an external stopper into the neck of a bottle to become pleated and secured therein.

Nicol U.S. Pat. No. 2,776,787 discloses a can wherein one can end has openings formed therein, with an indicia-printed tab secured over the openings by a pressure sensitive adhesive. Prior to securing the individual tabs, each is separated at a weakened line from a continuous strip of tabs.

Stern U.S. Pat. No. 1,087,469 discloses a top perforated cover of a salt package covered by a paper disk having an adhesive ring applied to the peripheral edge portion of the disk. The latter may be torn off, or holes punched therethrough into the cover perforations, in order to dispense the salt.

Belgian U.S. Pat. No. 642,366 appears to disclose a container having a flanged, perforated end cover, with a sheet mounted over the end cover.

Jensen, Jr. U.S. Pat. No. 4,549,917 discloses a laminating device for forming laminated layers of paper and transparent film, wherein perforated window patterns are die cut in the paper prior to the paper being bonded to the film, with the perforated window patterns being thereafter removed.

Rusincovitch et al U.S. Pat. No. 5,676,787 discloses a wall covering forming apparatus for printing a pattern of spacers on a release sheet and thereafter combining same into a roll with a substrate having an adhesive applied thereon. Upon unrolling, the spacers transfer to the substrate.

Forming multiple-layered laminated materials for packages for foodstuffs are disclosed in Frydendal U.S. Pat. No. 4,300,969 and Andersson U.S. Pat. No. 4,657,614. A foil rolling process for producing dual-layered thin gauge metal foil is disclosed in Monks U.S. Pat. No. 4,530,230.

SUMMARY OF THE INVENTION

A general object of the invention is to provide an improved method for manufacturing rolls of dual-layered lids suitable for being applied to single use containers carrying particulates, such as spices, cheeses, and the like, and protecting same until dispensing of the particulates is desired.

Another object of the invention is to provide rolls of so-called, "daisy chains" or ribbons of dual, bonded-together lids, wherein each outer layer bears predetermined printed indicia and is adapted to being peeled from the inner layer, and wherein each inner layer is perforated so as to be adaptable to dispense particulates therethrough upon peelably removing the outer layer.

A further object of the invention is to provide a continuous in-line method for producing rolls of dual, peelably-bonded-together lid layers mounted around cores, wherein one layer includes either perforations or cut lines formed therethrough, and the other layer includes selected indicia printed thereon.

A still further object of the invention is to provide a continuous, single line method for converting two webs of material into individual rolls of ribbons of dual layered, peelably-bonded-together lids, wherein one layer of each lid is perforated and the other layer of each lid is printed with selected indicia.

These and other objects and advantages will become more apparent when reference is made to the following drawings and the accompanying description.

BRIEF DESCRIPTION OF THE DRAWINGS

FIG. 1A is a fragmentary alternate arrangement for a portion of the FIG. 1 printing press;

FIG. 3 is an enlarged fragmentary perspective view of a portion of the FIG. 2 structure;

FIG. 4 is an enlarged fragmentary side elevational view of a portion of the FIG. 1 structure;

FIG. 5 is an enlarged fragmentary view of the wound-core product produced by the methods of the FIGS. 1 and 5 presses, FIG. 6 is an enlarged plan view of a single dual-layered lid portion of FIG. 5, FIG. 7 is a side elevational view of an alternate embodiment of the FIG. 1 printing press;

FIGS. 8 and 9 are fragmentary alternate arrangements of portions of the FIG. 7 printing press; and FIG. 10 is a perspective view of a container having the FIG. 5 lid mounted thereon.

BEST MODE OF CARRYING OUT THE INVENTION

Figure 1:
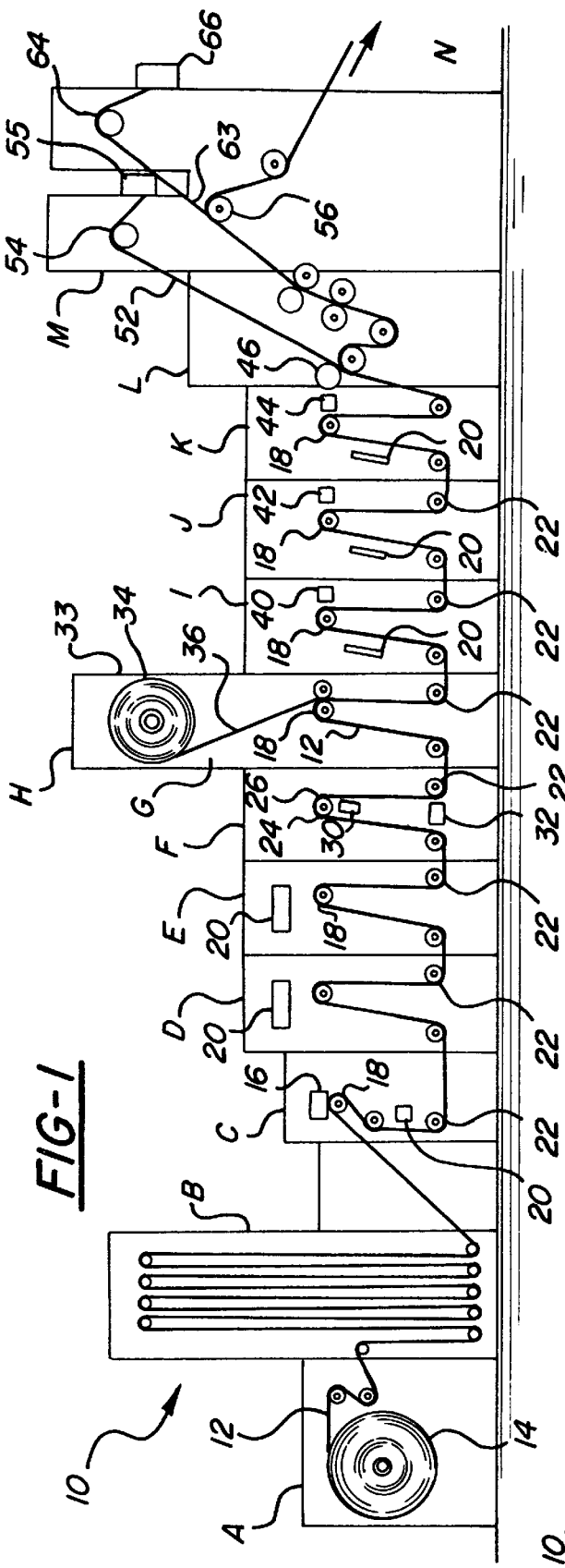
FIG. 1 is a side elevational view of an in-line lid printing press embodying the invention.
Figure 2:
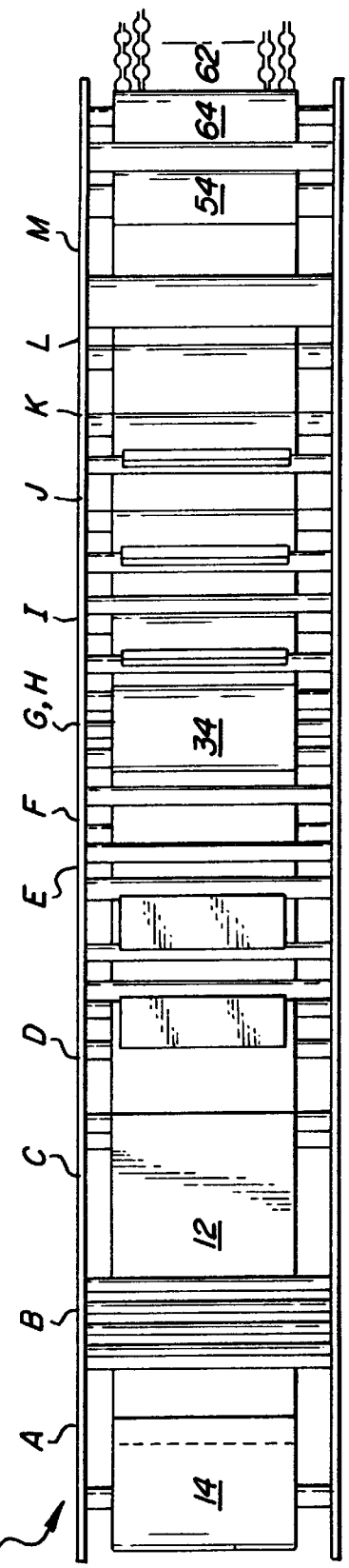
FIG. 2 is a plan view of the FIG. 1 structure.

FIG. 1 illustrates a continuous moving, in-line lid printing press 10 including a first web-loading station A supplying a first web 12 from a roll 14 of selected roll stock to an accumulator B, and, thence, on a shallow upward slope to a first print station C.

At the print station C, an adhesive printer 16 prints FDA-approved adhesive in a predetermined pattern on the web as it travels over an upper roller 18. The pattern may consist of rings or solid circles spaced across the web, for purposes to be described. The web then travels substantially vertically downwardly past a heater and blow drier combination 20, to a lower roller 22, and, thence, upwardly at a steeper slope to second drying station D. This drying step is repeated through the next station E. Each of the stations D and E includes rollers 18 and 22, and a heater and drier combination 20.

At the next-in-line station F, a roller-shaped die cutter 24 has a plurality of circular cutters, represented as 26 of a predetermined diameter formed on the peripheral surface thereof for forming dispensing holes 28 (FIG. 6) in a predetermined pattern of, say, ten groups across the web 12. As the web travels around the die cutter 24, vacuum from a source 30 beneath the die cutter sucks the plugs from the holes 28 as they pass the die cutter downwardly to a collection unit, represented as 32. Alternately, the source 30 may be a source of air under pressure, serving as an air eject blower to blow the plugs from the holes 28 outwardly. Each group of holes 28 includes a center hole surrounded by a predetermined number, say, eight equally spaced holes (FIG. 6).

As shown in FIG. 1A, the die cutter arrangement at station F may include a die 24a having circular cutters, represented as 26a, cooperating with an anvil roller 27 having mating cavities (not shown). The web 12 is fed between the die 24a and the roller 27 to have plugs cut into the web. The plugs are immediately sucked from the web downwardly through a funnel-shaped vacuum source 30a. The now perforated web 12 then travels between two idler rollers 31 and 31a downwardly to the roller 22 and, thence, upwardly to another roller 18 of a further station G.

A laminating tower 33, including a second web-loading station H, is located above the station G. The station H includes a roll 34 of selected roll stock, activated to supply a second web 36 to the roller 18 of the further station G onto the exterior surface of the adhesive covered web 12, to become peelably bonded thereto.

A desired plurality of print stations, such as stations I, J and K, each includes rollers 18 and 22, and a heater and blow drier combination 20 and serves to progressively receive the bonded together webs 12 and 36, and print selected indicia, represented as 38 (FIG. 6), from sources of black and/or various colored ink printing units 40, 42 and 44, such as by flexographic printing, onto the exposed face of the web 36. After each printing step, the usual heater/drier 20 serves to dry the respective printed indicia 38. More or fewer print stations may be provided, depending upon the particular indicia application.

A die cut station L follows the last print station K. At station L, an overhead die cutter 46 cuts through the overlying web 36 a lateral row of peelable lid shapes 48 (FIGS. 5 and 6) around the printed indicia 38 and with the underlying groups of holes 28 centrally located relative thereto. A lift tab 50 (FIGS. 5 and 6) is cut to extend beyond the periphery of the adhesive pattern. Inasmuch as the waste material 52 of the web 36 between the lid shapes 48 is outside of the abhesive pattern and the tab 50 and, therefor, not bonded to the underlying perforated web 12, such waste material is directed upwardly over on a remote roller 54, or to be sucked into a vacuum pickup, including a bailor and vacuum source, represented as 55.

The die cut station L is followed by a further die cut station M including a die cutter 56 which cuts the now exposed web 12 into predetermined shapes 58 (FIGS. 5 and 6) around the peelable label shapes 48, while leaving longitudinally extending tabs 60 (FIG. 5) to interconnect the shapes 58. As such, the double layers of shapes 48 and 58 proceed as ribbons or "daisy-chains" 62, as shown in FIGS. 3 and 5. The waste material 63 between the shapes 58 and interconnected tabs 60 is directed upwardly from station M over a remote roller 64, to be sucked into a further vacuum pickup, including a bailor and a vacuum source, represented as 66.

The ribbons 62 are then fed into and across trays 68 at a station N for alignment with respective cardboard cores 70 mounted around mandrels 72 of a turret 74 at a rewinding station P.

As shown in FIG. 4, the turret 74 includes five equally spaced rotatable mandrels 72, each bearing a plurality of side-by-side cores 70, the number of which correspond to and align with the ribbons 62 being fed aross the trays 68. A suitable adhesive-dispensing unit, represented as 76, serves to apply two parallel rings of adhesive to each rotating core 70 on the mandrel 72 at the 6:00 o'clock position, while the adhesive-treated cores on the mandrel at approximately the 8:30 position are rotatably receiving the respective ribbons 62. At a predetermined count, the turret 74 rotates through 72°, and the next mandrel 72 begins receiving the ribbons 62, just after the ribbons have been cut by a suitable cutter, represented as 80. At the next position, the now fully wound cores 70 are slidably removed off of the mandrel 72, ready for packaging in shipping containers. Additional cores 70 are slidably mounted onto the mandrel 72 at the 3:30 o'clock position.

The web 12 may be formed of any suitable laminate paper or a thermoplastic material, or it may be coated on the underside thereof with such a material, say, polyethylene, so that the dispensable-food stuffs manufacturer who receives the core-wound ribbons of dual-layered perforated and peelable lids cuts individual lids from the ribbon, places same on the open top edge of his spice or cheese or other particulate product container (FIG. 10), heats the outermost peripheral edge, around the peelable lid to bond the perforated lids to the container, now ready for use as a single serving by an ultimate consumer. The consumer removes the peelable outer lid to expose the dispensing holes 28 in the underlying lid.

While various of the stations may be changed in their locations along the press 10, as one alternate embodiment, the above described station F of FIG. 1 is eliminated. In this configuration, the web 36 will enter the system, following station E, to become bonded to the adhesive pattern on the web 12. Thereafter, the die cutter 24, which may be positioned before the print station I, or between the stations K and L, becomes a die cutter which serves to cut circles through the thickness of the inner web 12 only within the periphery of the adhesive circular patterns or rings.

In this embodiment, plugs 82 (FIG. 6) formed by the cut circles, by virtue of the earlier applied solid circular adhesive patterns on the web 12, remain adhered to the outer web 36 through the remaining print stations and core winding steps. As such, the plugs 82 will ultimately be removed by the consumer along with the removal of the peelable labels 48, to thereby leave behind dispensing holes 88 atop the single service containers.

In the event rings of adhesive were applied at station C in lieu of solid circular patterns, the plugs 82 are vacuumed away by the source 30, thereby immediately leaving the dispensing holes 28.

Referring now to FIG. 7, an alternate embodiment is illustrated, wherein a rotary die consisting of two male dies 90 and 92 and a female vacuum component 93 are mounted at a first station C'. The web 12 is fed through the die to have six holes punched by the die 90 and three holes by the die 92 of each nine hole set formed across the web. The perforated web 12 is fed downwardly to lower idler rollers 94, to be fed to a down stream print station Q. At station Q the web is directed upwardly around an idler roller 95 to an adhesive printer 96 to have adhesive applied in ring patterns around each set of the nine holes. A laminating tower 97 includes a web-loading station P where a second web 36 is fed downwardly to start through one or more, such as three, typical printing and drying stations between the stations P and Q to have suitable indicia printed thereon. At station Q, the printed web 36 is fed upwardly, over two idler rollers 98 above the adhesive printer 96, and, thence, downwardly and across to a station R, where the web 36 becomes bonded to the web 12 between dual rollers 100. The bonded-together webs next enter a station S where the upper web 36 is cut into peelable lids by a die cutter 102 and the lower web 12 is cut into ribbons by a die cutter 106, with the respective waste materials being removed by vacuum sources 104 and 108 similar to the above described stations L and M of FIG. 1, and, thence, to the station N and the turret 74.

Referring now to fragmentary FIGS. 8 and 9, it is noted that the first station C" does not include the die arrangement 90/92/93. Rather, the web 12 is fed downwardly to the idler rollers 94, and, thereafter, the operational steps are similar to the FIG. 7 arrangement, except that a die cutting station S has replaced the station S of FIG. 7. At station S', vacuum dies 110 and 112 will cut through the web 12, respectively, three holes and six holes of the nine hole pattern shown in FIG. 6. The perforated web proceeds to a compound die, represented as 114, to have the peelable lids 48 and the underlying ribboned lids 58 and their tabs 60 cut in one cutting operation, with the total waste materials being removed by a vacuum source 116.

If it were desired for a particular lid application, well known turn bars (not shown) may be employed both before and after one of the prior stations to turn one or the other of the webs 12 or 36 over for a selected printing of, for example, a prize designation or other indicia, on the underside, and then returned right-side-up.

Referring now to FIG. 10, there is illustrated a finished individual lid 120 with its overlying peelable lid 122, cut from the ribbon or daisy chain 62 of FIG. 5, and mounted on a single use container 124, which may be filled with shakable spice, cheese, or other particles, for use by the ultimate individual consumer.

Industrial Applicability

It should be apparent that the invention provides an improved, novel, continuous moving, in-line methods for producing an improved, practical and readily usable roll of dual-layer lids, wherein the outer lid includes any desirable printed indicia and/or logos and is peelable from an inner lid, wherein the latter has either dispensing holes formed therein, or plugs cut therethrough which are removable with the peelable lid portion to form dispensing holes.

It should be further apparent that the inventive methods produce ribbons or, so-called, "daisy chains" of tab-connected dual-layered lids mounted around cores for shipment to packaging customers, who, in turn, cut the ribbons into single dual-layered lids and secure same at their outer peripheries to containers full of shakable particulates, such as spices, cheeses, etc.

While but four general embodiments of the inventive method and an inventive roll of interconnected daisy-chains of lids, as well as individual containers filled with shakable products and covered with dual-layered, printed and perforated individual lids have been shown and described, other modifications thereof are possible within the scope of the following claims. For example, die cutting, laminating, and the introduction of webbings can occur within any of the stations. If necessary for a particular application, more than two webs could be involved.

What is claimed is:

1. A ribbon of dual lids comprising a central core; a first plurality of selectively shaped lids each having one of a plurality of selected holes formed therein or a plurality of through-cut rings formed therein to form plugs within the confines of the rings, and interconnected by longitudinally and oppositely extending, non-perforated tabs; a second plurality of selectively shaped lids having selected indicia printed on the exposed faces thereof, and secured to the first plurality of lids and, where present, to said plugs; and said dual lids being wound around said central core for a predetermined number of windings, each of said second plurality of lids being superimposed on each of said first plurality of lids has been inserted.

2. The ribbon of dual lids described in claim 1, wherein said first plurality of lids have a plurality of selected holes formed therein.

3. The ribbon of dual lids described in claim 1, wherein said first plurality of lids have a plurality of through-cut rings formed therein to form plugs within the confines of the rings.

4. A plurality of ribbons of dual lids cut longitudinally side-by-side from a pair of bonded together webs, wherein each ribbon includes a first plurality of perforated lids interconnected by longitudinally and oppositely extending interconnected tabs and having dispensing perforations formed in each lid exclusive of the interconnected tabs, and a second plurality of lids longitudinally spaced apart and laminated to said respective perforated lids, and having selected indicia printed thereon.

* * * * *